United States Patent [19]

Gennetten et al.

[11] Patent Number: 4,631,586
[45] Date of Patent: Dec. 23, 1986

[54] DIGITAL RASTER TIMING ENCODER/DECODER

[75] Inventors: Edward W. Gennetten, San Diego; Duane A. Gomez, El Cajon, both of Calif.

[73] Assignee: United States of America as represented by the Secretary of the Navy, Washington, D.C.

[21] Appl. No.: 617,220

[22] Filed: Jun. 4, 1984

[51] Int. Cl.$^4$ .......................... H04N 5/04; H04N 7/04
[52] U.S. Cl. .................................... 358/148; 358/141; 358/142; 358/150
[58] Field of Search ............... 358/141, 142, 145, 146, 358/147, 148, 150, 151; 360/42

[56] References Cited

U.S. PATENT DOCUMENTS

| | | | |
|---|---|---|---|
| 4,316,219 | 2/1982 | Smith et al. | 358/150 |
| 4,380,027 | 4/1983 | Leventer et al. | 358/147 |
| 4,513,329 | 4/1985 | Gomez et al. | 360/42 |

Primary Examiner—James J. Groody
Assistant Examiner—Michael D. Parker
Attorney, Agent, or Firm—Robert F. Beers; Ervin F. Johnston; Edmund W. Rusche, Jr.

[57] ABSTRACT

The invention presents a digital raster timing encoder/decoder system wherein television raster synchronization pulses and other timing pulses and information data are generated. The invention comprises a digital clock source having coding circuitry which, combined with the clock source, encodes preselected digital signals containing information on raster synchronization control and timing, and also any other information data that is desired. The encoded signal output is transmitted either directly or via some special transmission link, for example by use of a Manchester Decoder clock multiplier (MDCM) system, to a receiving and decoding circuit. The received signal is decoded to create timing signals for operation control of the video television scanning system, and to read out other desired digital data that has been also transmitted within the signal. The system takes advantage of the fact that control signals of conventional synchronization pulses contain large deadband areas within which additional data information may be placed. Such additional digital information may be used to add other control pulse capability, or to add information transmission capability. A principal feature of the system is that only a single channel is needed to transmit synchronization pulses and any additional timing pulses or information of interest.

16 Claims, 12 Drawing Figures

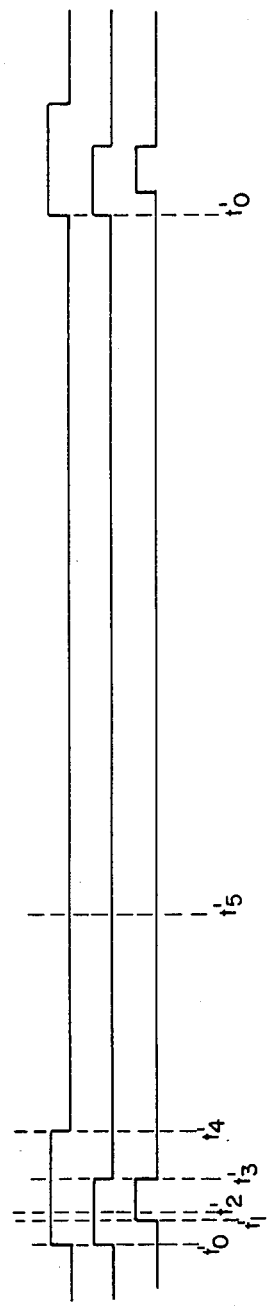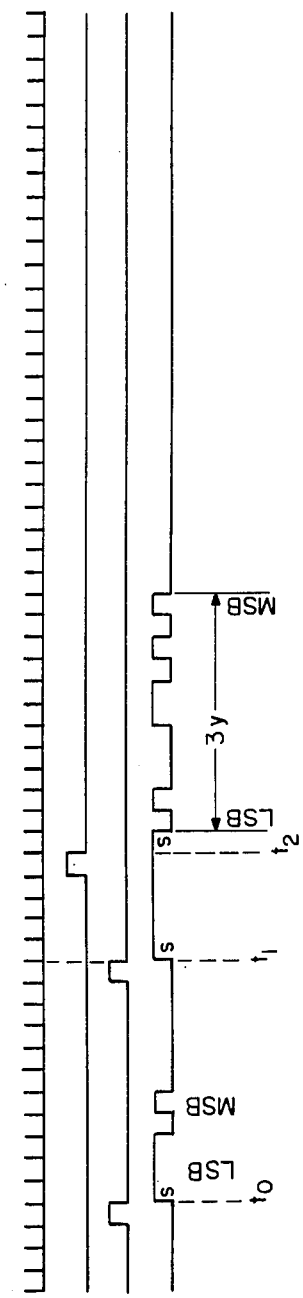

DIGITAL RASTER TIMING ENCODER/DECODER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

An application filed on Sept. 1, 1983 by Aldan D. Gomez and Edward W. Gennetten with Ser. No. 528,386, now U.S. Pat. No. 4,513,329, is related to the present application. The title of that application is "Manchester Decoder Clock Multiplier". The subject matter of that application has been incorporated in the claims of this application.

BACKGROUND OF THE INVENTION

Conventional video systems require the use of many timing pulse controls to maintain proper operation and to display video data. Multiple pulse signals are required to trigger and time control operational functions of the video display. Conventional systems require separate cables to transmit each pulse signal. Such pulse control signals include horizontal blanking, horizontal synchronization, horizontal drive, vertical blanking, vertical synchronization, and vertical drive.

Pulse signals which control these particular functions are subject to uncertainty in their time control. This uncertainty is caused by the rise time required for the pulse signal to respond. Such rise time delays tend to cause instability in control of the video picture. This instability is usually reflected in horizontal jitter of the video picture as viewed by the observer.

Due to present technological improvements present video systems are tending more towards raster scan techniques. One principle reason for this is that system memories are becoming less expensive. Less expensive memories means that higher resolution displays become more efficient, economical and attractive for use. Conventional television standards in the United States provide video systems with approximately 525 TV lines. From this, one can reasonably expect to obtain a maximum of 500×500 pixels of resolution. However, 1000×1000 picture elements or pixels is optimum. To increase resolution from 500×500 to 1000×1000 pixels means the quadrupling of memory and bandwidth. Memory no longer creates a problem, however, bandwidth imposes limitations due to the fact that wider bandwidth requirements translate into rise time delay problems in control signal pulses.

The task of transmitting synchronization pulses to different memory plane circuits that unload and serialize the memory data into a serial bit stream of video is a key problem in the art. The unloading and serialization must be accomplished within a narrowband of time because of the wide bandwidth of the video.

Consider a typical case where the video bandwidth is 54 MHz which translates into an 18 nsec. bit, i.e., the time of one picture element or pixel. To maintain any control over the time stability of unloading and serialization, the jitter in the synchronization pulses must be significantly less than the pixel time. Therefore, the synchronization pulses must be stable over their period within technically two to four nsec.

To meet such a tolerance in timing, conventional synchronous generators must be of special design. However problems will still exist. The transmission of conventional synchronization pulses down long cables poses level detection problems in the analog comparators receiving the pulses. The detection problem manifests itself in jitter. Specifically the capacitance in the cable integrates the synchronization pulses so that the threshold of detection does not remain at a constant level.

Synchronization pulses from a specially designed conventional synchronization generator can be transmitted to the receiver by direct line connection or by other methods, such as Manchester encoding the transmitted signals. From a specially designed conventional synchronous generator, output pulses of typically two nsec rise and fall times can be Manchester encoded and transmitted differentially. The pulses thereby enjoy the same type tolerances in timing.

A disadvantage of this approach still exists. Each conventional synchronization pulse must have its individual Manchester encoder, cable, connectors, and Manchester decoder. Typically, a minimum set of synchronization pulses includes horizontal synchronization, horizontal drive, horizontal blanking, vertical synchronization, vertical drive, and vertical blanking. The extra hardware required by the system means more volume, weight, power, and cost. A need clearly exists to identify and present a system that overcomes these limitations and incorporates a method by which only one cable need be used to transmit synchronization signals to their receivers within the video system.

The invention presented herein is a digital raster timing encoder/decoder system which uses only one cable to transmit digitized signals that contain all necessary information of the conventional synchronization pulse signals as well as other desired information.

SUMMARY OF THE INVENTION

A digital raster timing (DIRT) encoder/decoder system is presented which reduces the necessary cabling and connectors required for a raster scan video system. The invention increases capabilities and critical timing tolerances of raster scan synchronization pulses. The end result is positive control and tight timing tolerance regarding alignment of pixels. The high degree of precision timing provided by the DIRT system offers definite advantages over conventional techniques.

Principle features of the DIRT system are:

(1) only a single channel is needed to transmit synchronization pulses, (2) additional timing pulses and other forms of information can be added anywhere in the raster with minimal hardware addition, and, (3) if a special Manchester decoder, referred to as a Manchester Decoder Clock Multiplier (MDCM) is used, the DIRT system can generally be operated at lower frequencies. The MDCM is the subject of another invention application by Gomez et al, which is pending with the Patent and Trademark Office under application No. 528,386 with a filing date Sept. 1, 1983.

Basically, the present invention is a digital raster timing encoder/decoder system wherein television raster synchronization pulses and other timing pulses and information data are generated. The invention comprises a digital clock source and a coding means which combined with the clock source encodes preselected signals containing information on raster synchronization control and timing, and also any other information data as desired. The encoded signal output is transmitted either directly or via some special transmission link, for example by use of the MDCM system, to a receiving and decoding means.

The received signal is decoded to create timing signals for operation control of the video television scanning system, and to read out other desired digital data that has been also transmitted within the signal. The system takes advantage of the fact that control signals of conventional synchronization pulses contain large deadband areas within which additional digital information may be placed. Such additional digital information may be used to add other control pulse capability, or to add information transmission capability. Specifically, the system uses digital four-bit code words to identify both the leading and trailing edges of synchronization control pulses.

OBJECTS OF THE INVENTION

An object of the invention is to reduce the cabling, connectors and other hardware as required for transmission of raster scan synchronization control pulses in video systems, or systems similar in operational nature.

A second purpose of the invention is to increase capability and improve timing accuracy of raster scan synchronization pulses.

A further object of the invention is to provide capability for adding special synchronization pulses or other digital information data at any point in time throughout the raster, and for easily changing the synchronization points with precise control over their timing.

And yet another object of the invention is to provide a digital raster timing encoder/decoder system with the ability to operate in conjunction with a Manchester Decoder Clock Multiplier transmission system thereby allowing operation of the encoder/decoder system at low frequencies while providing high frequency resolution output data.

And yet a further object of the invention is to provide the capability for creating control synchronization pulse signals of higher stability and accuracy than exists in conventional video systems.

These and other objects of the invention will become more readily apparent from the ensuing specification when taken together with the drawings.

BRIEF DESCRIPTION OF THE DRAWINGS

FIG. 1 shows general waveforms for horizontal blanking, horizontal drive, and horizontal synchronization pulse signals.

FIG. 2 presents sample digital waveforms which display the type of signals created by the digital raster timing (DIRT) system.

DESCRIPTION OF THE PREFERRED EMBODIMENT

Figure 3:
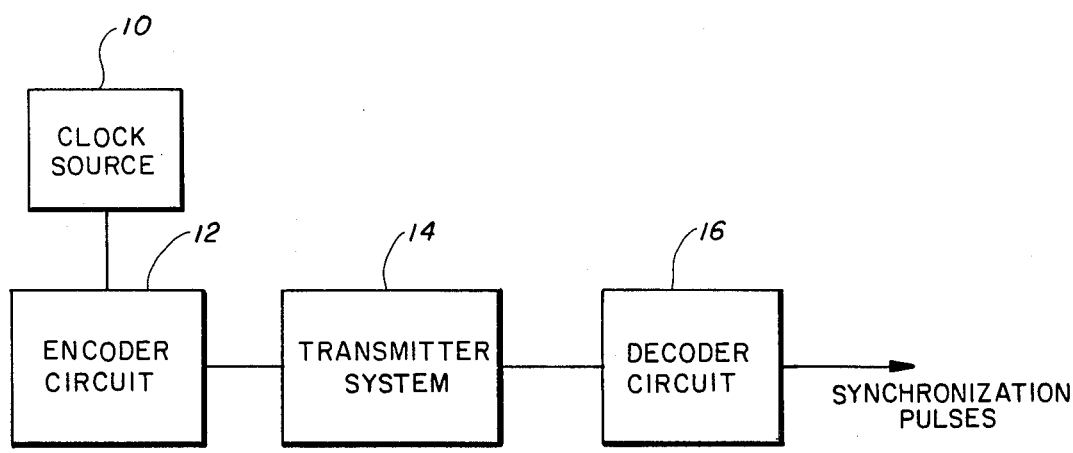
FIG. 3 is a block diagram exhibiting the general structure of the DIRT system concept.

The digital raster timing encoder/decoder system is shown in its basic form in the block diagram of FIG. 3. Fundamentally, the system incorporates an encoder circuit 12, a transmitter system 14, a decoder circuit 16, and a clock source 10, which can either be inherent within the encoder circuit or attached as a separate unit. The encoder circuit 12, under the general timing control of clock source 10, encodes a digital signal which is output and transmitted to decoder circuit 16. Digital code signals generated within encoder circuit 12 denote the location of leading and trailing edges for conventional analog pulses that are used to control the horizontal and vertical functioning of a video raster.

In this preferred embodiment the digital code signals are generally considered of a four-bit type, although clearly eight bit and perhaps higher bit characters or codes can be used. Within decoder circuit 16 the received digital signal is read and translated back into conventional analog pulse signals. These pulse signals represent standard video pulse signals for controlling horizontal blanking, horizontal drive, horizontal synchronization, vertical blanking, vertical drive, and vertical synchronization, as well as other possible control functions of a video raster display, and are output from the decoder circuit into the video system.

Because of the nature of the analog pulse waveforms for controlling the various video raster functions, much dead time is available between individual control pulses. The deadbands available, for example in horizontal blanking, drive or synchronization, can be used advantageously by adding select digital information concerning control or data. Such additional signals are encoded digitally onto the master signal in the proper time location and sequence, and transmitted with the master signal to the decoder where such information is stripped and translated by the decoder and directed to its particular circuit. For example, it is possible to incorporate added data for identifying any particular location on the raster screen, an identification number for a particular horizontal scan line, frame information pertaining to a particular video frame of interest, or any other pertinent information of importance to the user of the system.

The transmitter system 14 may actually be nothing more than a single cable connecting the output of encoder circuit 12 to the input of decoder circuit 16. However, with the ability of this invention, it is feasible to take advantage of the reduction to a single cable capability for transmitting the various control functions and added information by utilizing a conventional Manchester decoder or a specialized transmission circuit, for example a Manchester decoder clock multiplier (MDCM) system. The MDCM system outputs conventional data and clock information plus a multiplicity of high frequency clocks. For example, for a 54 MHz system, the DIRT encoder need only to operate at 13 MHz. Operation at this low frequency saves the circuit board designer from having to contend with a multitude of problems associated with the design of a system for operation at the higher frequency. The MDCM can decode the Manchester encoded DIRT encoded signal into DIRT code data and the conventional thirteen MHz clock associated with the DIRT code data. In addition, clocks of n times times the thirteen MHz clock can also be generated where n is a nonnegative integer. It is further understood as obvious that a transmission system could be contemplated wherein long distance transmission could be accomplished via some form of a telemetry system.

FIG. 1 presents the conventional waveforms for conventional analog pulse signals wherein waveform 1a represents a horizontal blanking pulse signal, waveform 1b represents a horizontal drive pulse signal, and waveform 1c represents a horizontal synchronizing pulse signal. It can be seen that the leading edge of the pulse signal for horizontal blanking and horizontal drive occur at the particular time $t_0'$. Similarly other time points, for example $t_1$, $t_3$, and $t_4$, are shown to also represent either leading or trailing edges of one of the conventional pulse signals. The time point $t_5'$ has been placed at a dead space located between control pulses for the three pulse signals presented in FIG. 1. It is within this type of deadband region that additional information may be injected.

The method associated with the DIRT system is represented and displayed more effectively by the digital signal waveforms shown in FIG. 2. The digital signal waveform 2d represents a standard digital clocking signal. The digital signal waveforms 2c and 2b show digital bit signals injected at points that will be discussed in more detail below.

Digital signal 2a presents a more useful representation of the DIRT methodology and relates directly back to the examples of the conventional analog pulse waveforms shown in FIG. 1. (Note that the time axis of FIG. 2 is expanded in relation to FIG. 1.) In particular, the encoder creates bit structures starting with an alerting bit of logic 1 identified by the S on the waveform 2a. Following the alerting bit signal a four-bit code is injected. For example, after the S bit at time $t_0$ the four-bit code 1011 (equivalent to decimal #11) has been injected by the encoder. This code corresponds to the identification of the leading edge of the conventional analog pulse waveforms 1a and 1b. In addition, a second alerting logic 1 bit exists at the time $t_1$ and is followed by a four-bit code of 1111 which in this circumstance would represent the leading edge of the horizontal synchronization pulse represented in waveform 1c. Waveform 2a also shows the ability of the DIRT method for utilizing the dead space of conventional signal for injecting additional digital bits to carry other useful information. At time $t_2$, which is a deadband time point corresponding to $t_2'$ in FIG. 1, another alerting logic 1 bit S is injected and followed by a digital code of length 3y. This code can be used to identify the particular number of the horizontal scan line that the control pulse signal corresponds with, or other data of interest to the user.

The alerting pulses S are detected within the decoder causing the following digital codes to be read and processed to recreate either the analog pulse signals for control of the video raster scan system, or to retrieve the information that might be stored within a digital code located within the available deadband regions. Such digital code is translated and transmitted for its particular use by the operator of the system.

The DIRT system through prespecified code words can identify and translate various different events occurring within the various conventional analog pulse waveforms. In particular, one code word can be identified to represent the occurrence of the leading edges of both the horizontal blanking pulse and the horizontal drive pulse, each of which occur at $t_0'$. A second code word can be identified and used to identify the leading edge at time $t_1'$ for the horizontal synchronizing waveform. Further code words can be identified to the trailing edges at the particular times they occur. Consequently, considerable improvement in stability of the video signal is possible. This advantage, of course, is concurrent with the existence of the advantage of adding other information and data to be transmitted in deadband areas by the digital DIRT signals.

Figure 4:
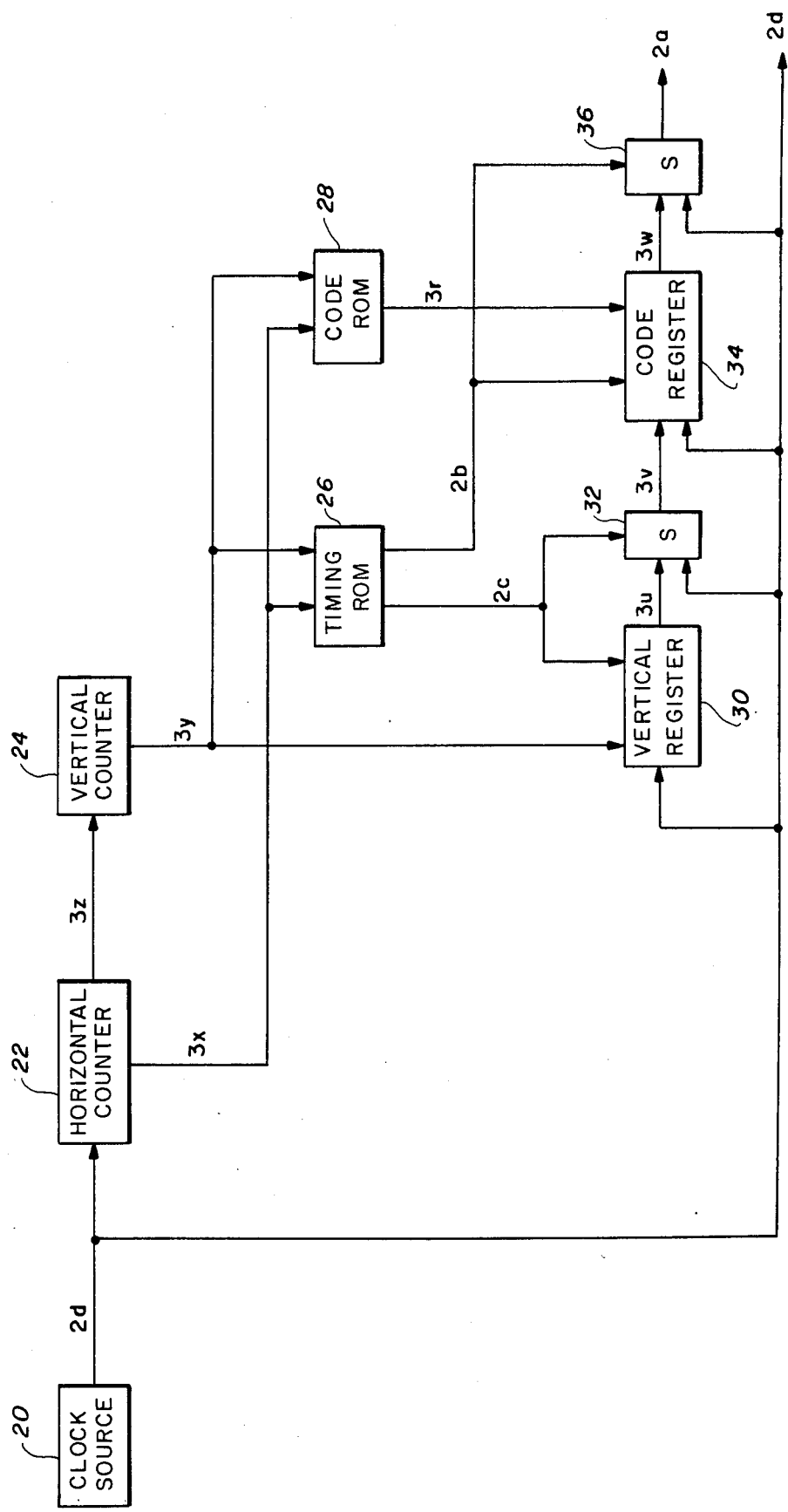
FIG. 4 presents a detailed block diagram of the encoder portion of the DIRT system showing the vertical counter connected to a vertical register.
Figure 11:
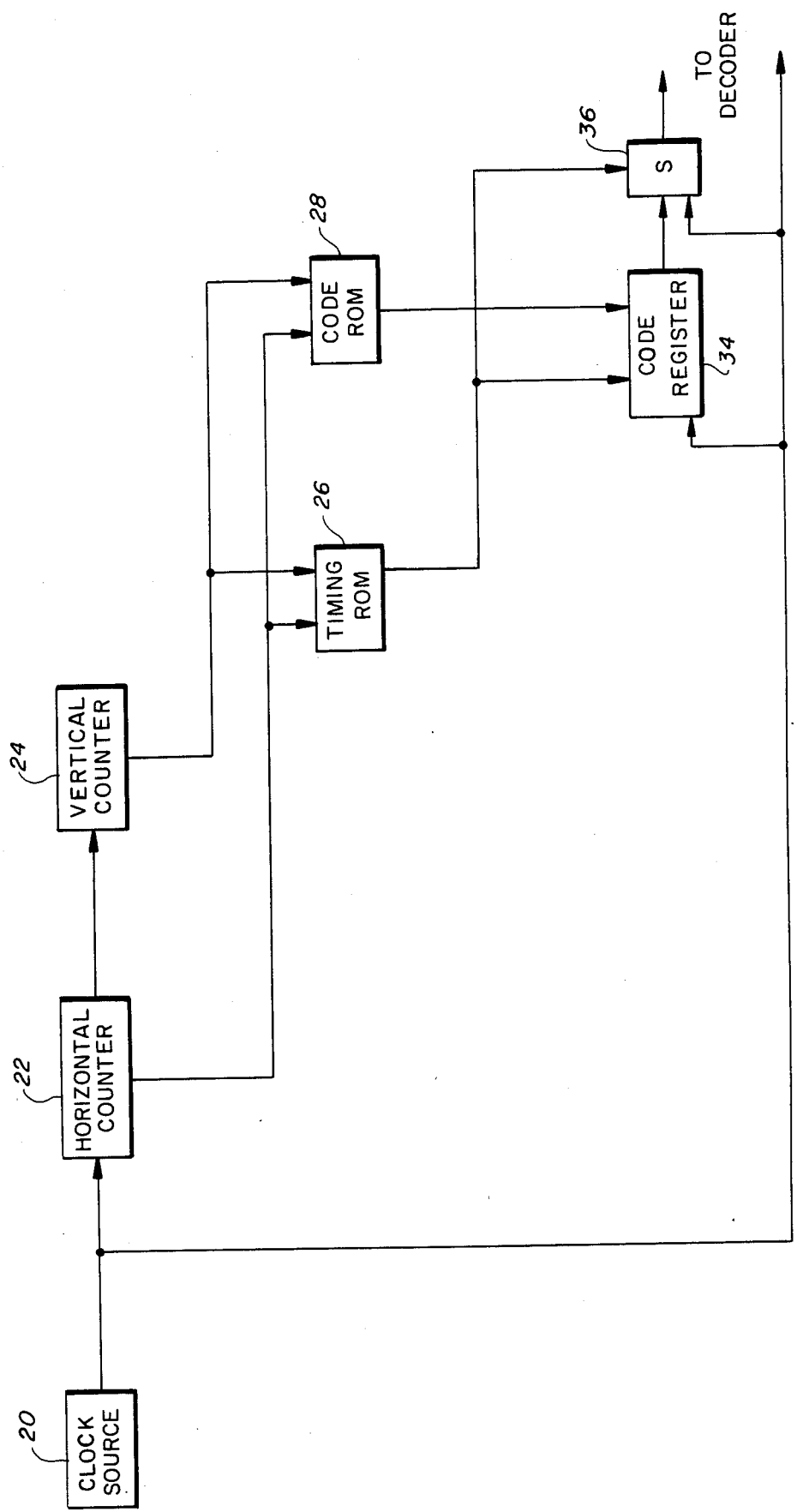
FIG. 11 shows a detail block diagram of the encoder portion of the DIRT system in its basic embodiment.
Figure 12:
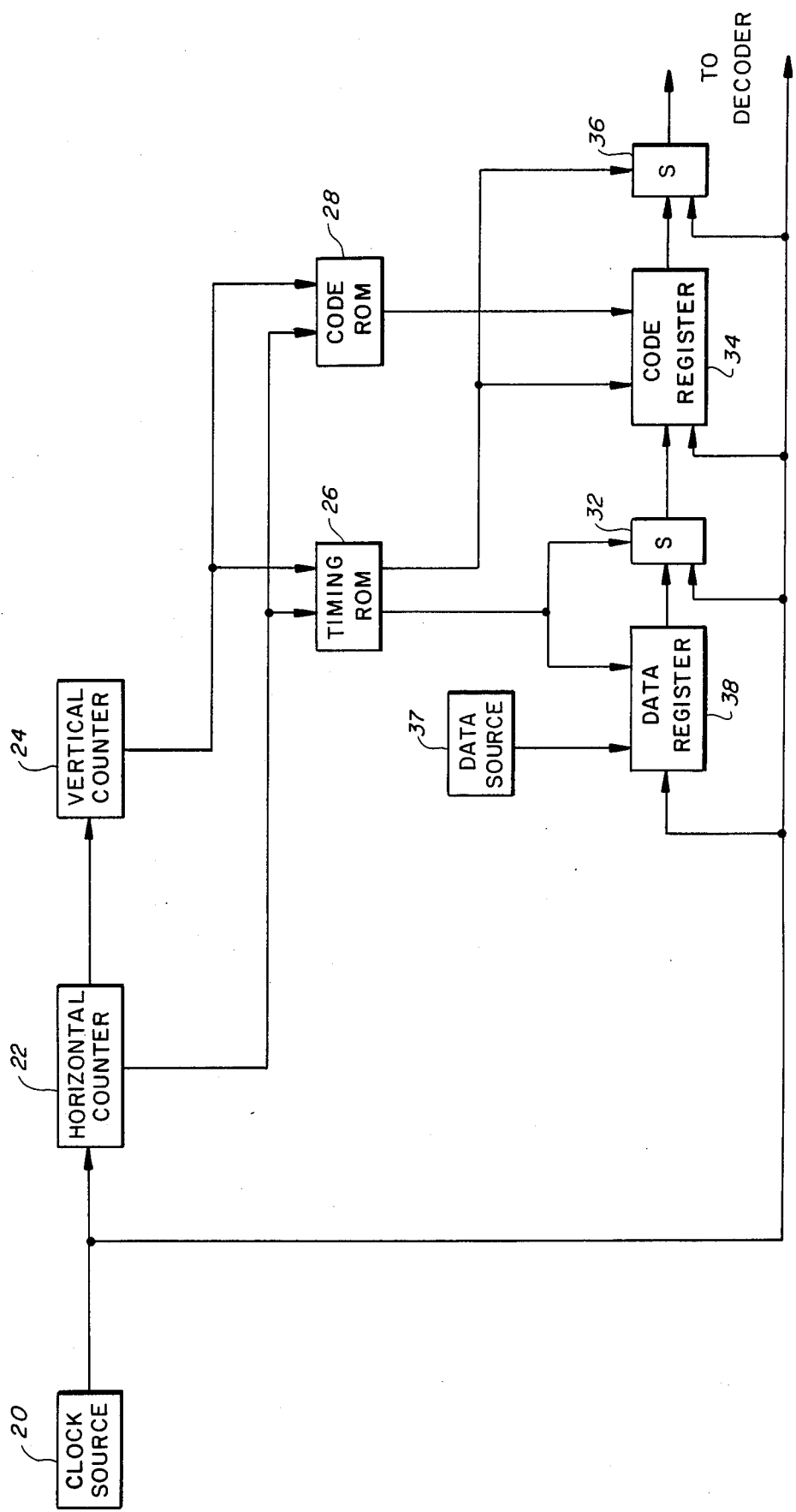
FIG. 12 presents a detail block diagram of the encoder portion of the DIRT system with a data source and register added.

Detailed embodiments of the DIRT encoder are shown in block diagram form in FIGS. 4, 11 and 12. FIG. 11 shows the basic embodiment of the encoder without ability to add outside source data. FIG. 12 shows an embodiment wherein predetermined external data may be encoded upon the basic video control signals through a data source 37. FIG. 4 shows a more specific embodiment wherein such predetermined external data comprises the count from a vertical counter 24 which provides vertical location information. Clearly, the connection of data register 38 (FIG. 12) to the vertical counter 24 will allow capability to encode vertical location information in combination with select external data items.

With reference to FIG. 4, the clock source 20, which is a stable oscillator employing typically a quartz crystal in a resonant circuit, provides a clock signal 2d as shown in FIG. 2. The horizontal counter 22 is clocked by clock signal 2d to produce a set of counts. The signal 3z output from horizontal counter 22 represents the period of the most significant bit and equals the time of one horizontal line. This horizontal line rate signal 3z provides a clocking means for controlling the vertical counter 24. The output signals 3x and 3y from horizontal counter 22 and vertical counter 24 are sequences of counts that are coupled into the address ports of a timing ROM 26 and a code ROM 28.

One output from the timing ROM 26 is DIRT load pulse signal 2b which synchronously loads the output DIRT code signal 3r from the code ROM 28 into a code register 34. Simultaneously, signal 2b loads a logic 1 start bit S into a one bit start register 36.

The code register 34 and start register 36 serialize the parallel entry of data which occurs, for example, at times $t_0$ and $t_1$ as shown in FIG. 2. The output of serialized signal 3w connects to the input of start register 36 in a manner so that the combined outputs of code register 34 and start register 36 are the serial DIRT encoded data signal 2a.

The ability for optional synchronous loading of a horizontal line number identified as 3y in FIG. 2 and its preceeding start bit S into the DIRT encoded data of signal 2a at time $t_2$ is accomplished by a load pulse signal 2c which is output from timing ROM 26. After parallel entry of the digitized bit code representing the horizontal scan line number (3y) into a vertical register 30 with the logic 1 into a start register 32, the start bit S and line number 3y are also serialized onto the DIRT encoded data signal 2a as shown in FIG. 2. This encoded line number signal (3y) has been clearly encoded into a blank region of the conventional analog pulse waveform.

The clock signal 2d is the clock used for registers 30, 32, 34, and 36. The serial input to the vertical register 30 comprises logic 0's which fill the gaps between DIRT codes. The serial output signal 3u from register 30 couples to the serial input of register 32; the serial output signal 3v from register 32 couples to the serial input of register 34; and the serial output signal 3w from register 34 couples to the serial input to register 36. The serial DIRT encoded data signal 2a from register 36 is the encoder output along with the clock signal 2d.

The output signals 2a and 2d from the DIRT encoder are the inputs to the DIRT decoder. As mentioned earlier, connection between the DIRT encoder and DIRT decoder may be direct or may be via some preselected interconnecting technique. Usually, however, a Manchester encoder/decoder is inserted between the DIRT encoder and decoder. Such Manchester encoder/decoder is used for all the usual purposes, but a conventional Manchester encoder/decoder will not utilize the full capability of the DIRT encoder/decoder concept. For this reason the special Manchester decoder mentioned earlier, the MDCM, is a interface device which will provide not only clock signal 2d and data signal 2a but additional clock signals of higher frequency.

Figure 5:
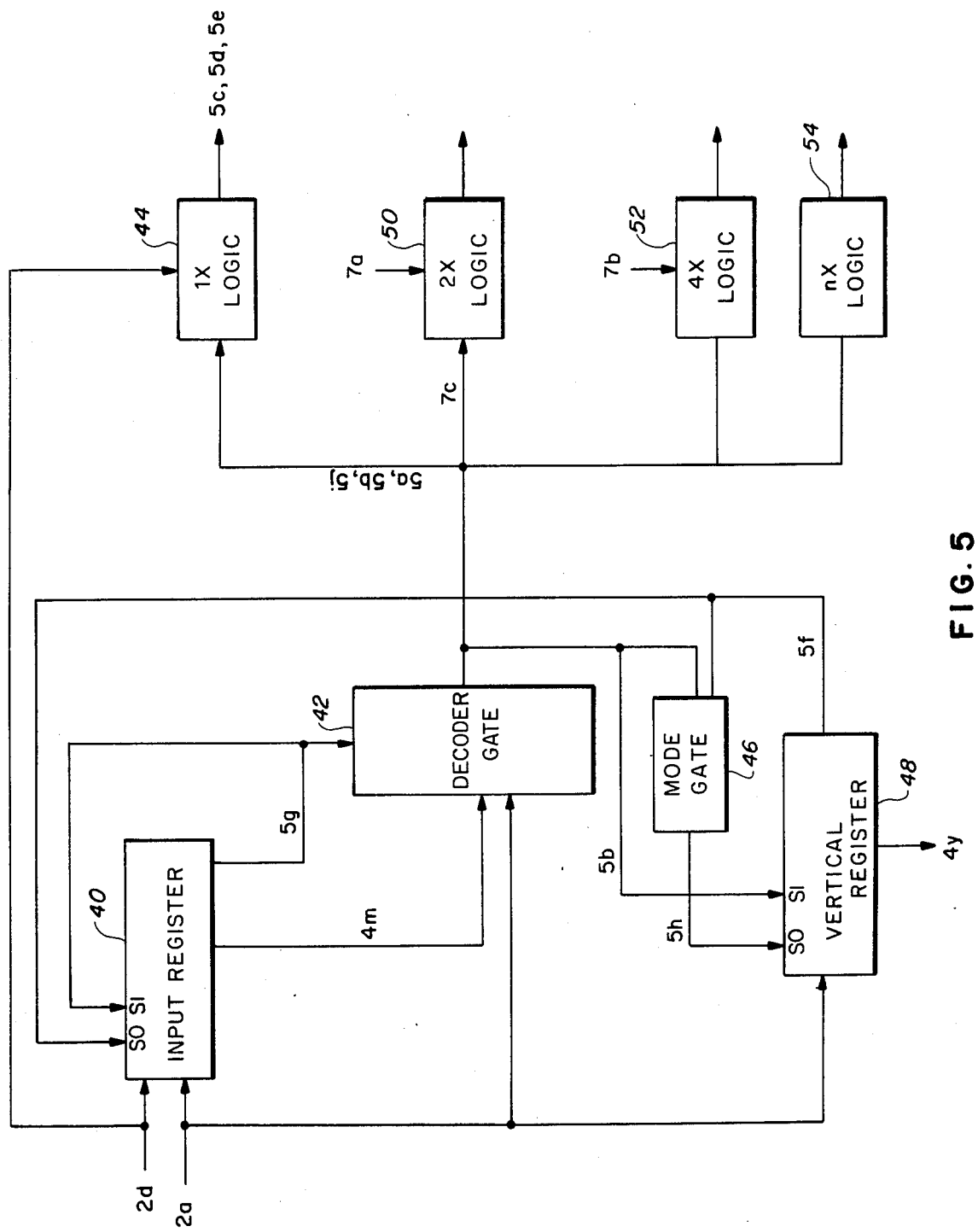
FIG. 5 shows a more detailed block diagram for the decoder portion of the DIRT system.
Figure 6:
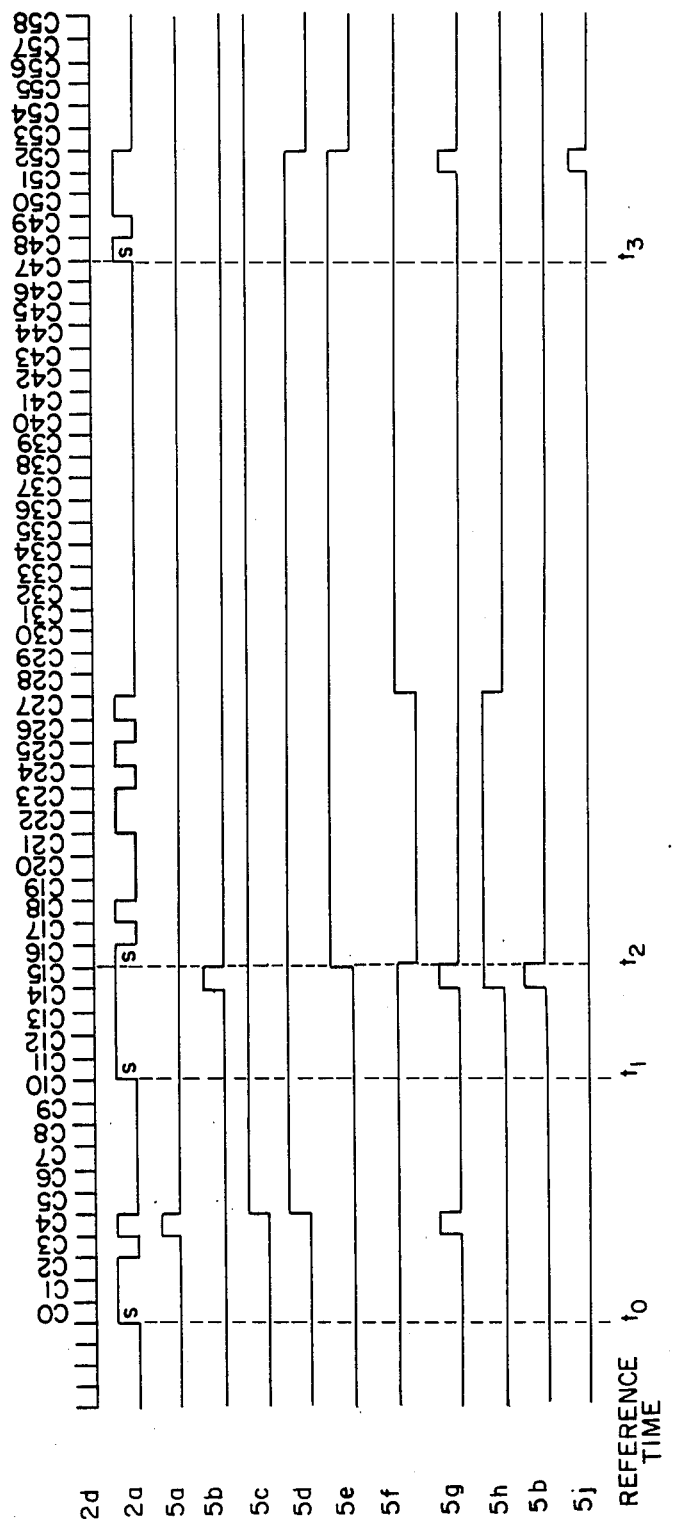
FIG. 6 presents examples of digital waveforms referenced on the block diagrams presented by FIGS. 4 and 5.

FIG. 5 presents a detailed block diagram of the DIRT decoding circuit. The key components of this circuit are an input register 40 and decoder gate 42. In FIG. 6 principle signal waveforms within the decoder circuitry are illustrated with reference time marks as used in FIGS. 1 and 2, and with clock bit periods denoted by $c_n$ where n=0, 1, 2, 3 . . . . The four bit serial shift register 40 right shifts DIRT encoded data signal 2a in response to the clock signal 2d. Register 40 is what is referred to as a universal shift register having four distinct modes of operation represented generally by the following truth table.

| S1 | S0 | |
|---|---|---|
| 0 | 0 | Hold |
| 0 | 1 | Shift Right |
| 1 | 0 | Shift Left |
| 1 | 1 | Parallel Load |

Between DIRT codes, in the time interval of a succession of logic 0's, input register 40 is in the right shift mode since control signal 5f (as shown in FIG. 6) is logic 1 and the control signal 5g is logic 0. As a DIRT code enters input register 40, no change in mode control signal 5g occurs until the start bit S reaches the right most flip-flop within input register 40 at a bit period identified as c4. Then control signal 5g becomes a logic 1 which enables the decoder gate 42 to accept the four bits of the DIRT code. During bit period c4 the DIRT most significant bit is on the data line signal 2a and the three least significant bits are parallel output signals 4m from the input register 40. The signal 5a, output from decoder gate 42, results from the decode of DIRT code that began at time $t_0$. Output signal 5b results from the decode of DIRT code that began at time $t_1$. And, decoder output signal 5j results from the decode of the DIRT code that began at time $t_3$. It should be understood that FIG. 6 illustrates the decoding of only three of the fifteen DIRT codes defined by the four-bit encoded DIRT code used for this description.

Figure 7:
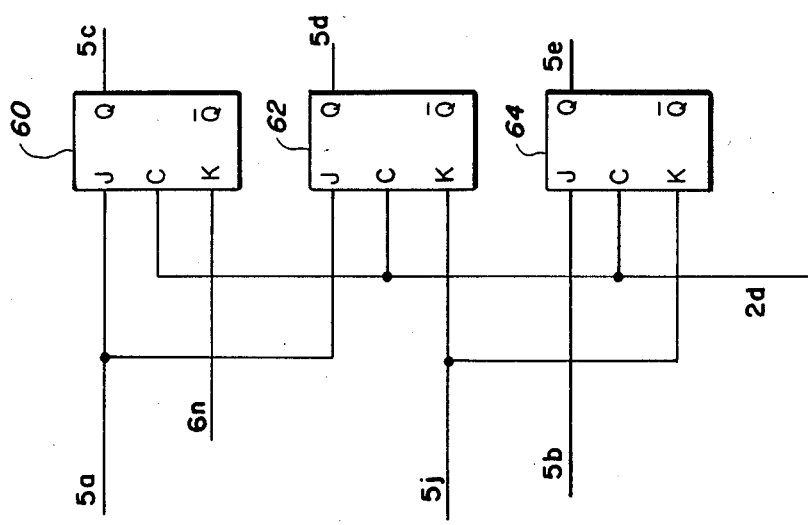
FIG. 7 presents a block diagram of the standard logic output circuit from the decoder portion of the DIRT system.

Another fundamental component to the decoder circuit is the 1x logic circuit 44 shown in FIG. 5. FIG. 7 illustrates in more detail a typical example of a 1x logic circuit which receives the outputs of decoder gate 42. As shown the 1x logic circuit is comprises of three jk flip-flops 60, 62, and 64. Each flip-flop is fed certain signals output by decoder gate 42 such as signal 5a, 5j, 5b, and another signal 6n, not shown herein, which is a single pulse waveform similar to 5a, 5j, and 5b, but would occur off-scale right in FIG. 6. All of these signals are results of preselected four-bit encoded DIRT code words. Decoder gate 42 outputs a signal 5a which results in an assertion, i.e., change from logic 0 to logic 1, in the horizontal blanking signal 5c which is output from jk flip-flop 60, and in the horizontal drive signal 5d which is output from jk flip-flop 62. This change occurs at the end of the bit period identified as c4 and is in response to the clock signal 2d transition. The negation of blanking signal 5c will occur when the output signal 6n from decoder gate 42 is asserted.

The asseration of horizontal synchronization signal 5e occurs at the end of the bit period identified as c15 with decoder gate 42 output signal 5b and clock signal 2d acting through jk flip-flop unit 64. The negation of both the horizontal drive signal 5d and the synchronous signal 5e occurs at the end of bit period c52 as a result of the signal 5j output from decoder gate 42 in conjunction with clock signal 2d acting on jk flip-flop units 62 and 64.

The assertion and negation of other synchronization pulses like vertical blanking, drive, and synchronization occurs in a manner similar to the description provided above for the horizontal pulses, namely signals 5c, 5d and 5e.

Other synchronization pulses not ordinary in television art can be inserted any place in the raster such as at a time $t_5'$ as shown in FIG. 1. To accomplish this it is required that proper bit patterns be located in the timing ROM 26 and code ROM 28 of the encoder circuit, and that decoder gate 42 outputs which correspond to the selected DIRT codes be appropriately connected to a jk flip-flop so as to produce the assertion and negation of the jk flip-flop output in the preselected required sequence.

Input register 40 is synchronously loaded in parallel with logic 0's at the end of bit periods having an asserted decoder gate 42 output like signals 5a, 5b, and 5j. The parallel load control signal 5g assertion results from the start bit S being clocked into the most significant bit of the input register 40. Note that synchronously loading of the logic 0's results in the negation of the control signal 5g which reverts the input register 40 mode of operation back to a serial shift right mode. Hence DIRT codes plus their start bit S can be transmitted one after the other if so desired.

Figure 8:
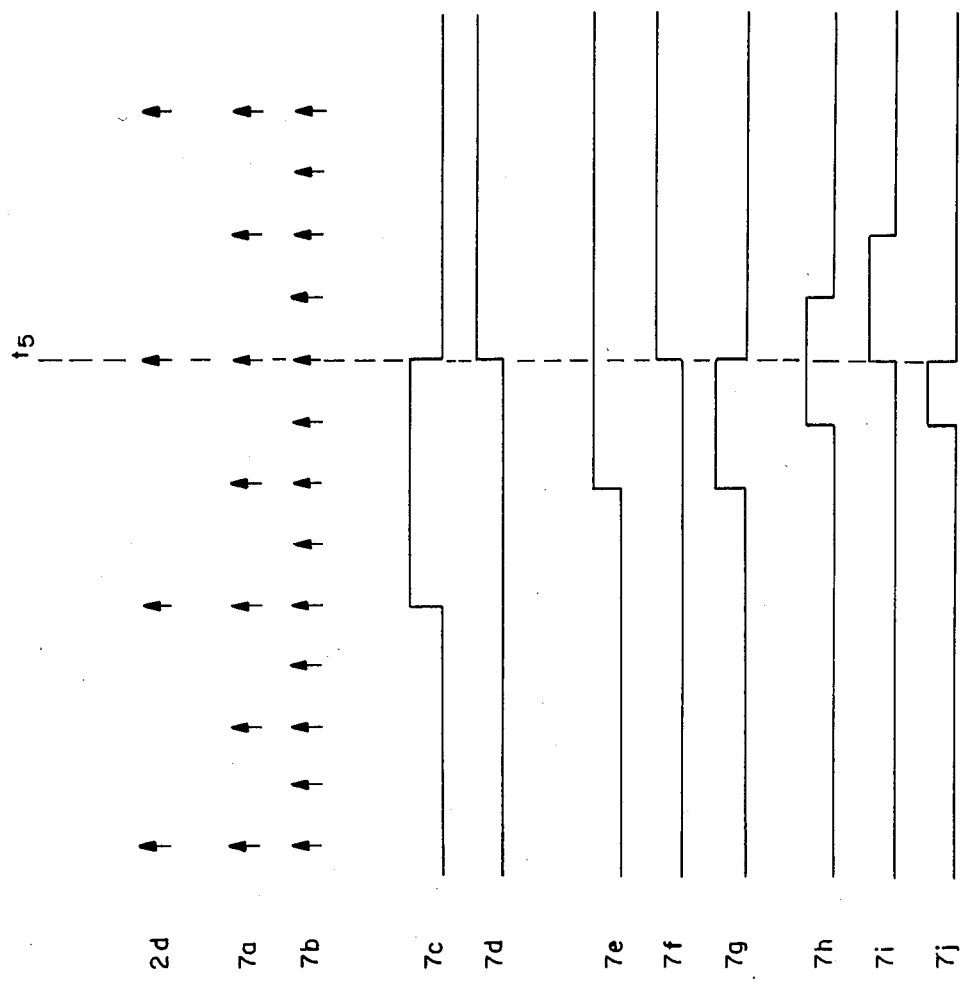
FIG. 8 presents example waveforms that are referenced in FIGS. 5, 6, and 7.

The minimal configuration of the DIRT decoder circuit has been shown in FIG. 5 and described above. The capabilities of the decoder circuit may be further expanded by a variety of preselected techniques. One example is to insert the MDCM in series with the DIRT encoder and decoder circuits. Consider the DIRT encoder circuit 12, output clock signal 2d and output data signal 2a are coupled to the MDCM. The MDCM outputs are a reconstruction of the DIRT encoder outputs, signals 2a and 2d. However the MDCM outputs provide additional clock signals that are a multiple of the clock signal 2d frequency as shown in FIG. 8. Clock signal 7a is at twice the frequency of clock signal 2d and clock signal 7b is at four times the frequency of clock signal 2d.

Figure 9:
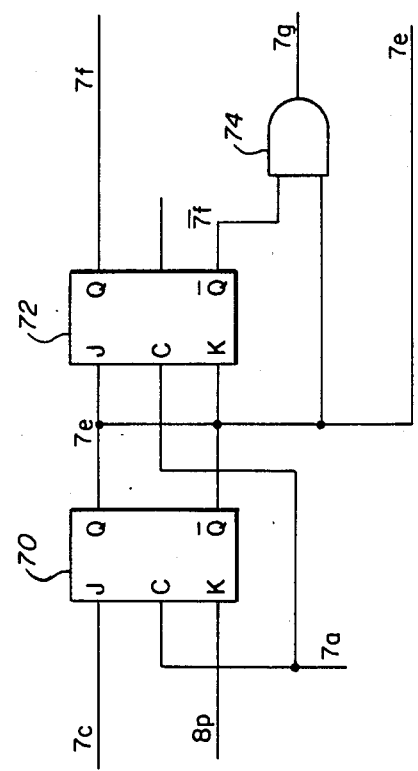
FIG. 9 presents a block diagram of an optional 2× logic circuit on the output of the decoder portion of the DIRT system.

An alternative expansion to the decoder circuit as shown in FIG. 5 would be to incorporate a 2x logic circuit element 50. The 2x logic circuit 50 is shown in more detail in FIG. 9. The 2x logic circuit 50 is comprised of the jk flip-flop units 70 and 72 and the AND gate 74. The circuit receives a decoder gate 42 (FIG. 5) output signal 7c which is an output similar to the signals 5a, 5b, and 5j of FIG. 6 except that this decoder gate output signal represents some specific time within the active video portion of a horizontal line, for example at a time $t_5'$ as shown in FIG. 1. The clock signal 7a, FIG. 9, detects decoder gate 42, FIG. 5, output signal 7c to produce a signal 7e output from the Q terminal of jk flip-flop unit 70. Signal 7e is shifted through jk flip-flop unit 72 and clock signal 7a to produce the output signal 7f. Signal 7g is produced by the logical AND gate 74 acting on signal 7e and the complement of signal 7f. The 2x logic circuit outputs of signal 7e and 7g are examples of signals that provide twice the resolution in comparison to the outputs of the 1x logic circuit 44. A signal 8p as shown in use in FIG. 9 and not illustrated herein, is another DIRT encoded digital signal output from decoder gate 42. In select applications signal 8p may equal signal 7c.

Figure 10:
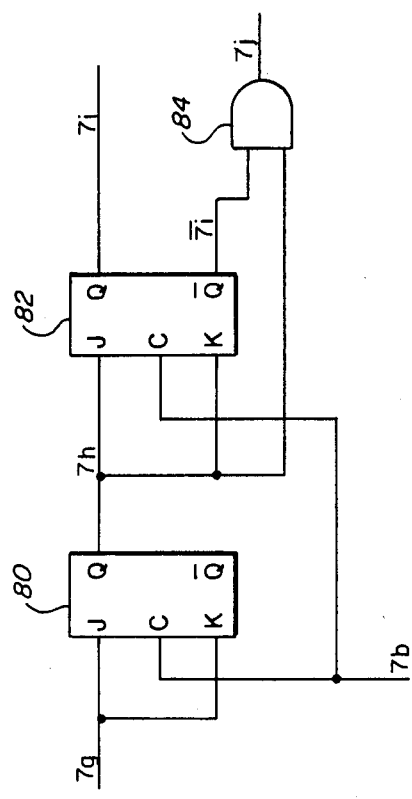
FIG. 10 presents a block diagram of the 4× logic optional circuit on the output of the decoder portion of the DIRT system.

A further option available with the DIRT techniques is the addition of a 4x logic circuit 52 as shown in FIG. 5. Such a 4x logic circuit is shown in more detail in FIG. 10. The 4x logic circuit receives the 2x logic circuit 50 output signal 7g as shown in FIG. 10. Another input to the 4x logic circuit could be signal 7e in select applications. Signal 7g is shifted through jk flip-flop unit 80 with the signal 7b to produce signal 7h. Signal 7h is then shifted through flip-flop unit 82 using clock signal 7b to produce signal 7i output from the Q terminal of flip-flop unit 82. A four time logic output 7j is constructed from the action of the AND gate 84 acting on signals 7h and the complement of signal 7i. Signals 7h and 7j are four times the resolution of the output signals from the 1x logic circuit.

Signals 7c, 7g, and 7j can all initiate processing at their respective clock rates during a common clock edge at a selected point in time as illustrated in FIG. 8 at time $t_5$. To combine several videos so that perfect registration between images results, the various videos can be phased in time by incorporating delay lines in series with selected video signals as is commonly done in the art with production video switchers used in t.v. stations.

Another modification to the minimal configuration of the DIRT decoder circuitry is the detection of the horizontal line number contained in the digital code seqence identified as 3y. Referring to FIG. 5, a vertical register 48 and a mode gate 46 comprise the line number 31 detection circuitry. The vertical register 48 is a universal type of register. When input register 40 is shifting right, the vertical register 48 is in the hold mode because control line signals 5b and 5h are both logic 0. Since the insertion of the line number code 3y, at time $t_2$, is immediately after the decoder gate signal 5b, signal 5b is used to initiate a change in mode of operation in registers 40 and 48. Control line signal 5f is a logic 1 because the most significant bit, that is, the right most bit in the register 48, is the start bit S from a previous load of register 48.

During a bit period identified as c15, vertical register 48 enters the load mode. At the lcock signal 2d edge at time $t_2$ the vertical register 48 is synchronously loaded with all zeroes. Then the old line number and start bit S are eliminated. Elimination of the S bit causes control signal 5f to be negated immediately following time $t_2$. The combination of control line signals 5f and 5g made up of logic 0's puts the input register 40 into a hold mode. Also following time $t_2$, control signals 5b and 5h are logic 0 and 1 respectively. This causes vertical shift register 48 to be put in the shift right mode. Control signal 5h is generated by mode gate 46 which is just an OR gate; the gate output is signal 5h which equals the logical OR of 5b along with the complement of 5f.

During the time interval corresponding to the range of bit periods c16 through c27 the start bit S and subsequent 11 bit line number 3y are clocked into the vertical register 48 thereby pushing the logic 0's out the right end and maintaining control signal 5f in the logic 0 state until the start bit S reaches the most significant bit position in vertical register 48. At that time control signal 5f is reasserted and control signal 5h is negated causing input register 40 to revert to the right shift mode and vertical register 48 to revert to the hold mode. As long as vertical register 48 is in the hold mode the digital parallel output signal 4y from vertical register 48 will hold steady and provide a stable value of the horizontal line number 3y.

The ease at which horizontal line numbers can be distinguished makes it easy to annotate within the active horizontal line time of the inactive vertical field time. This capability would facilitate the bookkeeping operations in video systems where the information content of the images change at a low rate relative to the frame rate; examples, of such systems are surveillance and teleconference systems.

Obviously, many modifications and variations of the present invention are possible in the light of the above teachings. It is therefore to be understood that within the scope of the appended claims the invention may be practiced otherwise than as specifically described.

What is claimed is:

1. A digital raster timing encoder/decoder system, for generating horizontal and vertical control synchronization signals for a video raster scan and other preselected timing and digital data signals for said video scan, comprising:

a clock source;
 an encoding means connected to receive a clock signal from the clock source, said encoding means being preprogrammed to encode preselected digital signals to be output by said encoding means; and
 a decoding means disposed to receive the encoded digital signals which are output by said encoding means, said decoding means programmed to decode the digital signals; wherein
 the encoding means further comprises:
 first means for counting connected to receive the clock source signal, said counting means disposed to accumulate count related to the time progression for horizontal video scan segments;
 second means for counting connected to the output of the first counting means, said second counting means disposed to accumulate count in reference to the vertical control synchronization signals of the video raster scan;

first memory means connected to receive digital count signals from the first and second counting means;

second memory means connected to receive said digital count signals from the first and second counting means;

first means for registering, connected to receive said digital count signal from the second means for counting, a first digital timing signal from the first memory means, and also connected to receive the clock source signal, said first registering means storing said digital count signal for output; and second means for registering connected to receive the stored digital count signal output from the first registering means, a second digital timing signal from the first memory means, said signal from the clock source, and a digital code signal from the second memory means, said second registering means encoding said code signal ahead of the digital count signal output from the first registering means, said second registering means outputting said encoded digital signals to said decoding means.

2. A digital raster timing encoder/decoder system according to claim 1 wherein the decoding means comprises:

a decoder register means connected to receive as an input the digital signals output from the second registering means of the encoding means, and also disposed to receive as a second input the clock source signal, wherein said decoder register means serially shifts out the digital input signals in a predetermined manner;

means for deciphering connected to receive as inputs the digital outputs from the decoder register means and from the second registering means of the encoding means, said deciphering means translating the input digital signals into output data and timing signals; and means for converting the output translated signals into synchronization pulse waveforms wherein said synchronization pulse waveforms are output to control the operation of a video circuit.

3. A digital raster timing encoder/decoder system according to claim 2 wherein the converting means of the decoding means further comprises:

a plurality of jk flip-flop units prearranged to switch on and off according to the character of the translated signals from the deciphering means, said jk flip-flop units outputting conventional pulse waveform signals for control of a video raster scan.

4. A digital raster timing encoder/decoder system according to claim 3 which further comprises:

a Manchester Decoder Clock Multiplier (MDCM) system disposed between the encoding means and the decoding means, said MDCM receiving at its inputs the digital signals output from the encoding means, and also the clock source signal, said MDCM then outputting to the decoding means a conventional digital data signal and a base clock signal plus a multiplicity of clock signals with frequencies higher than, and including multiples of, the frequency of the base clock signal.

5. A digital raster timing encoder/decoder system according to claim 4 wherein the converting means of the decoding means comprises:

a plurality of said converting means connected to the output of the deciphering means, and each of the plurality of said converting means also connected to receive a separate signal of the MDCM output clock signals that are multiples of the base clock frequency, wherein the first of the converting means outputs a conventional synchronization pulse having a predetermined resolution, and wherein each of the plurality of the converting means outputs conventional synchronization pulse waveforms with n times the resolution of the first of the plurality of converting means, where n is a positive nonnegative integer.

6. A digital raster timing encoder/decoder system according to claim 5 wherein each converting means of the decoding means further comprises:

a plurality of jk flip-flop units with their inputs connected to receive the translated signals which are output from the deciphering means, and to receive preselected clocking signals from the MDCM system, wherein said flip-flop units are prearranged to switch on and off according to the character of their input signals, said jk flip-flop units outputting conventional pulse waveform signals for control of a video raster scan.

7. A digital raster timing encoder/decoder system according to claim 6 wherein the first and second memory means comprise:

read only memory devices.

8. A digital raster timing encoder/decoder system for generating horizontal and vertical control synchronization signals for a video raster scan system, and other preselected timing and digital data signals for said video scan, comprising:

a clock source;

an encoding means connected to receive a clock signal from the clock source, said encoding means being preprogrammed to encode preselected digital signals to be output by said encoding means; and a decoding means disposed to receive the encoded digital signals which are output by said encoding means, said decoding means programmed to decode with digital signals; wherein the encoding means further comprises:

first means for counting, connected to receive the clock source signal, said counting means predisposed to accumulate count related to the time progression for horizontal video scan segments;

second means for counting, connected to the output of the first counting means, said second counting means disposed to accumulate count in reference to the vertical control synchronization signals of the video raster scan;

first memory means connected to receive digital count signals from the first and second counting means;

second memory means connected to receive said digital count signals from the first and second counting means;

means for generating a digital data signal;

first means for registering connected to receive said digital data signal from the generating means, a first coded digital timing signal from the first memory means, and also connected to receive the clock source signal, said first registering means storing said digital data signal, from the means for generating, for output;

second means for registering, connected to receive the stored signal output from the first registering means, said first digital timing signal from the first memory means, and also the signal from said clock source, said second registering means encoding a first digital signal comprising a logic 1 ahead of the stored signal output from the first registering means, said second registering means connected to output a first composite digital signal;

third means for registering, connected to receive and store for output the first composite digital signal output from the second registering means, a coded digital count signal from the second memory means, a second digital timing signal from the first memory means, and also connected to receive the clock source signal; and fourth means for registering, connected to receive the stored signal output from the third registering means, said second digital timing signal from the first memory means, and also the clock source signal, said fourth registering means encoding a second digital signal, comprising a logic 1, ahead of the signal output from the third registering means, said fourth registering means outputting a second composite digital signal to said decoding means.

9. A digital raster timing encoder/decoder system according to claim 8 wherein the decoding means comprises:

a decoder register means connected to receive as an input the digital signal output from the fourth registering means of the encoding means, and also disposed to receive as a second input the clock source signal, wherein said decoder register means serially shifts out the digital input signal in a predetermined manner;

means for deciphering connected to receive as inputs the outputs from the decoder register means and from the fourth registering means of the encoding means, said deciphering means translating the input digital signals into input data and timing signals; and means for converting the translated signals into source data and synchronization pulse waveforms wherein said synchronization pulse waveforms are output to control the operation of a video circuit.

10. A digital raster timing encoder/decoder system according to claim 9 wherein the converting means of the decoding means further comprises:

a plurality of jk flip-flop units with their inputs connected to receive the the translated signals from the deciphering means wherein said flip-flop units are prearranged to switch on and off according to the character of the translated sgnals, said jk flip-flop units outputting conventional pulse waveform signals for control of a video raster scan.

11. A digital raster timing encoder/decoder system according to claim 10 which further comprises:

a Manchester Decoder Clock Multiplier (MDCM) system predisposed between the encoding means and the decoding means, said MDCM receiving at its inputs the composite digital signal output from the encoding means, and also the clock source signal, said MDCM then outputting to the decoding means a conventional digital data signal and a base clock signal plus a multiplicity of clock signals with frequencies higher than, and including multiples of, the frequency of the base clock signal.

12. A digital raster timing encoder/decoder system according to claim 11 wherein the converting means of the decoding means comprises:

a plurality of said converting means connected to the output of the deciphering means, and each of the plurality of said converting means also connected to receive a separate signal of the MDCM output clock signals that are multiples of the base clock frequency, wherein the first of the converting means outputs a conventional synchronization pulse having a predetermined resolution, and wherein each of the plurality of the converting means outputs conventional synchronization pulse waveforms with n times the resolution of the first of the plurality of converting means, where n is a positive nonnegative integer.

13. A digital raster timing encoder/decoder system according to claim 12 wherein the first and second memory means comprise:

read only memory devices.

14. A digital raster timing encoder/decoder system according to claim 13 wherein the decoding means further comprises:

means connected to the output of the deciphering means for translating preselected portions of the input data and timing signals into a signal to be output and read by external monitoring equipment, said translating means also connected to directly receive the composite signal from the fourth registering means of the encoding means.

15. A digital raster timing encoder/decoder system according to claim 14 wherein the translating means comprises:

a mode gate; and a data register, wherein the mode gate and data register strip off preselected input data and translate said data into a form that can be read out and monitored by external equipment.

16. A digital raster timing encoder/decoder system according to claim 15 wherein the first registering means further comprises:

an input from the second counting means whereby count data of vertical locations can be input as source data to be encoded by said first registering means.

* * * * *